US012601723B2

(12) United States Patent
DeGreeff et al.

(10) Patent No.: US 12,601,723 B2
(45) Date of Patent: Apr. 14, 2026

(54) INDICATING CROSS-CONTAMINATION OF VOLATILE ORGANIC COMPOUNDS BETWEEN CLOSED CONTAINERS USING A COLORIMETRIC SENSOR

(71) Applicant: The Government of the United States of America, as represented by the Secretary of the Navy, Arlington, VA (US)

(72) Inventors: Lauryn E. DeGreeff, Washington, DC (US); Christopher J. Katilie, Washington, DC (US); Janet Crespo-Cajigas, Miami, FL (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 146 days.

(21) Appl. No.: 17/672,490

(22) Filed: Feb. 15, 2022

(65) Prior Publication Data

US 2022/0308026 A1 Sep. 29, 2022

Related U.S. Application Data

(60) Provisional application No. 63/164,750, filed on Mar. 23, 2021.

(51) Int. Cl.
*G01N 31/22* (2006.01)
*G01N 21/78* (2006.01)
*G01N 21/80* (2006.01)

(52) U.S. Cl.
CPC ......... *G01N 31/223* (2013.01); *G01N 21/783* (2013.01); *G01N 21/80* (2013.01)

(58) Field of Classification Search
CPC ........ G01N 21/25; G01N 21/77; G01N 21/78; G01N 21/80; G01N 21/251; G01N 21/783; G01N 31/22; G01N 31/221; G01N 31/223; A61K 15/02
See application file for complete search history.

(56) References Cited

U.S. PATENT DOCUMENTS

| | | | |
|---|---|---|---|
| 3,711,251 A | 1/1973 | Goodson et al. | |
| 5,010,776 A | 4/1991 | Lucero et al. | |
| 5,445,795 A | 8/1995 | Lancaster et al. | |
| 6,027,344 A * | 2/2000 | Johanns ................... | G09B 9/00 434/283 |
| 6,391,262 B1 * | 5/2002 | Brinton ................ | G01N 31/224 422/402 |
| 10,408,809 B1 | 9/2019 | Emanuel et al. | |

(Continued)

OTHER PUBLICATIONS

Crespo Cajigas et al., "Towards a Vapochromic Colorimetric Sensor for the Cross-Contamination of Volatile Organic Compounds (VOCs)" 73rd AAFS Annual Scientific Meeting (Feb. 15, 2021).

(Continued)

*Primary Examiner* — Duane Smith
*Assistant Examiner* — Austin Q Le
(74) *Attorney, Agent, or Firm* — US Naval Research Laboratory; Joseph T. Grunkemeyer

(57) ABSTRACT

An apparatus having: a container, a first openable vessel within the container, an analyte within the first vessel, and a vapochromic sensor within the container. The vapochromic sensor changes color on contact with a vapor of the analyte.

9 Claims, 1 Drawing Sheet

(56) References Cited

U.S. PATENT DOCUMENTS

| | | | | |
|---|---|---|---|---|
| 2013/0222634 | A1* | 8/2013 | Setlur | G06T 7/90 |
| | | | | 348/222.1 |
| 2015/0253252 | A1* | 9/2015 | Smyth | G01N 21/77 |
| | | | | 422/429 |
| 2016/0245797 | A1* | 8/2016 | Ahmad | G01N 33/52 |

OTHER PUBLICATIONS

Defence Science and Technology Laboratory. Why and How to Control Contamination. 2018, pp. 1-2.
Goss, "The physical chemistry of odors—Consequences for the work with detection dogs" Forensic Science International 296 (2019) 110-114.
Ong et al., "Use of Mass Spectrometric Vapor Analysis to Improve Canine Explosive Detection Efficiency" Anal. Chem. 2017, 89, 6482-6490.
Sáiz et al., "Study of losses of volatile compounds from dynamites. Investigation of cross-contamination between dynamites stored in polyethylene bags" Forensic Science International 211 (2011) 27-33.

* cited by examiner

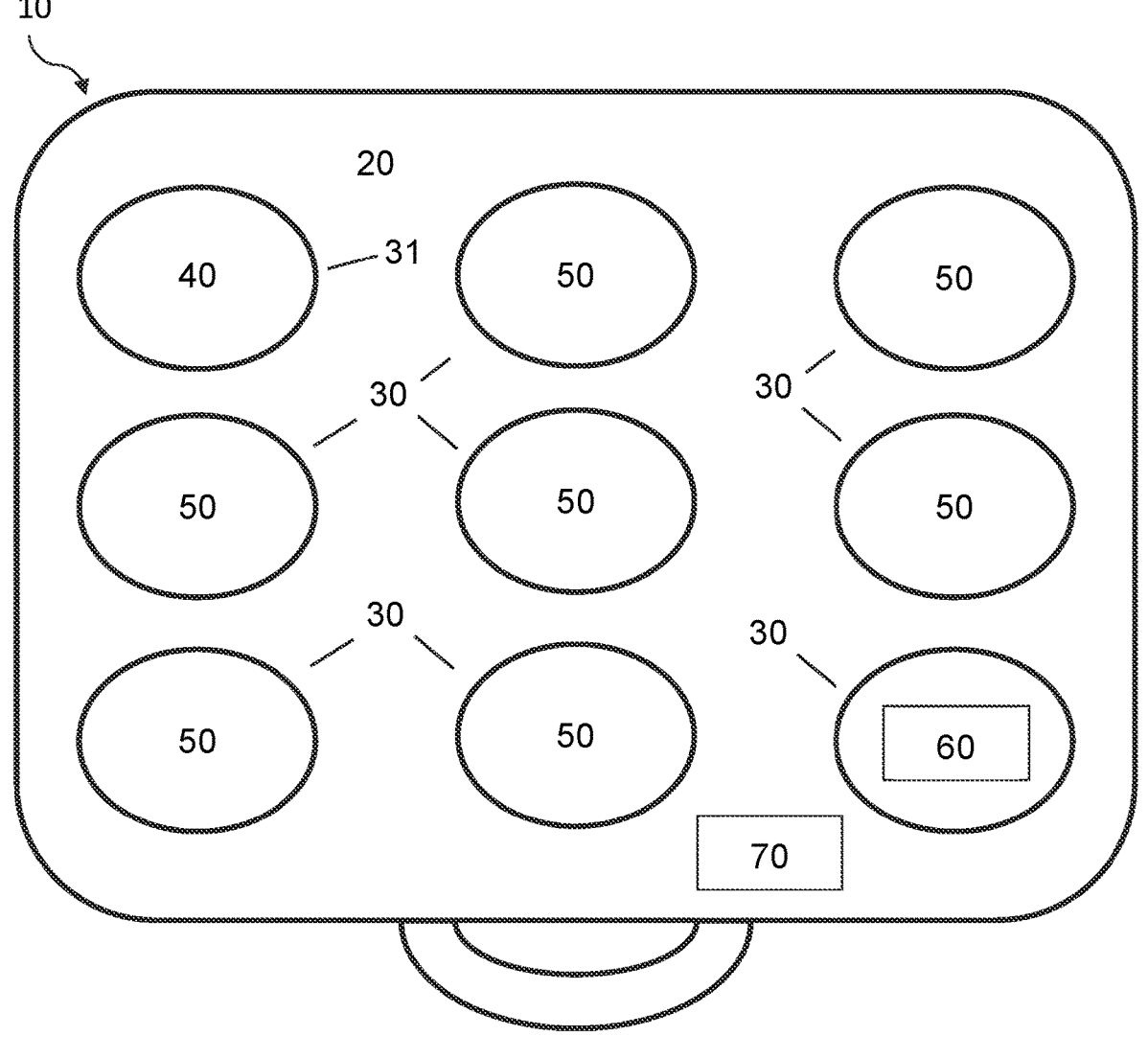

INDICATING CROSS-CONTAMINATION OF VOLATILE ORGANIC COMPOUNDS BETWEEN CLOSED CONTAINERS USING A COLORIMETRIC SENSOR

This application claims the benefit of U.S. Provisional Application No. 63/164,750, filed on Mar. 23, 2021. The provisional application and all other publications and patent documents referred to throughout this nonprovisional application are incorporated herein by reference.

TECHNICAL FIELD

The present disclosure is generally related to detection of cross-contamination.

DESCRIPTION OF RELATED ART

Volatile organic compounds (VOCs) can often be found at harmful levels in some workplace environments and may off-gas from many consumer products, such as plastics, that have the potential to contaminate surrounding items (Feng et al., Colorimetric Sensor Array for Determination and Identification of Toxic Industrial Chemicals. *Anal. Chem.*, 2010, 82 (22), 9433-9440; Tsai et al., Determination of Ethylene Oxide by Solid-Phase Microextraction Device with on-Fiber Derivatization. *J. Chromatogr. A*, 2003, 991 (1), 1-11; Nematollahi et al., Volatile Chemical Emissions from 134 Common Consumer Products. *Air Qual. Atmos. Heal.*, 2019, 12 (11), 1259-1265). Common practices, such as storing chemicals, or items that off-gas VOCs, closely together in enclosed spaces, give opportunity for cross-contamination to occur. While this is rarely critical in day-to-day circumstances, the presence of unwanted chemicals on stored canine scent training aids can lead to negative or possibly harmful effects (Simon et al., A Review of the Types of Training Aids Used for Canine Detection Training. Front. *Vet. Sci.*, 2020, 7, 313). Canines are widely recognized as highly sensitive biosensors and have been at the forefront of narcotics and explosives detection for many years, with growing usage in a large number of other industries. They have been known to perceive as low as one part per trillion concentration of the vaporous component of a target (Fazekas, Pawing Their Way to the Supreme Court: The Evidence Required to Prove a Narcotic Detection Dog's Reliability. *North. Ill. Univ. Law Rev.*, 2012, 32 (3), 473-506; Craven et al., The Fluid Dynamics of Canine Olfaction: Unique Nasal Airflow Patterns as an Explanation of Macrosmia. *J. R. Soc. Interface*, 2010, 7 (47), 933-943). However, the effectiveness of canine units is dependent on proper training and quality training aids. A canine's superior sense of smell is very likely to detect cross-contamination, even at trace levels, while humans remain unaware of the contamination, contributing to inefficient training. This was witnessed in a 1997 study verifying explosive detection performance, wherein canines trained on multiple distinct explosives were only able to find the most volatile explosive compounds due to the cross-contamination of their training materials (Hallowell et al., Effectiveness of Quality-Control Aids in Verifying K-9-Team Explosive Detection Performance. *Chem. Biol. Technol. Contraband Detect.*, 1997, 2937, 227-234). Additionally, in 2011, Sáiz et al. determined that there was a high chance for cross-contamination at room temperature between explosive compounds that were stored in polyethylene bags; similar to those that are used in the manufacturing of training aids (Sáiz et al., Study of Losses of Volatile Compounds from Dynamites. Investigation of Cross-Contamination between Dynamites Stored in Polyethylene Bags. *Forensic Sci. Int.*, 2011, 211 (1-3), 27-33). More recently, Goss (2019) emphasized the possibility of cross-contamination in the storage of odors due to the improper use of plastic containers and highlighted the use of glass and metal containers for safe storage (Goss et al., The Physical Chemistry of Odors—Consequences for the Work with Detection Dogs. *Forensic Sci. Int.*, 2019, 296, 110-114).

In general, canine training aids are designed to be easy to use and unsusceptible to contamination (Tipple et al., Comprehensive Characterization of Commercially Available Canine Training Aids. *Forensic Sci. Int.*, 2014, 242, 242-254). However, common storage procedures allow training aids to be stored in permeable or poorly sealed containment, different aids to be enclosed together in a single case, or training kits to be transported or stored at elevated temperatures in trunks or outdoor bunkers. Moreover, canine scent training aid kits contain multiple trainings aids for different compounds. Although the kits tend to be specific to a certain class of chemicals (ex. drugs or explosives kit), cross-contamination between chemicals contained, particularly those of greatly disparate vapor pressures, could be detrimental to a canine's scent detection training. Training aid care of this manner is in conflict with general "best practice" guidelines, such as those published by the Defense Science and Technology Laboratory in the United Kingdom (Defence Science and Technology Laboratory. Why and How to Control Contamination. 2018, pp 1-2). In the United States, there are no specific guidelines for training aid storage to prevent cross-contamination.

A main concern of cross-contamination is that the canines will alert to contaminants instead of the target scent while their handlers remain ignorant, resulting in false positives or negatives (Furton et al., The Scientific Foundation and Efficacy of the Use of Canines as Chemical Detectors for Explosives. *Talanta*, 2001, 54 (3), 487-500). To address this issue, in 2017, a field vapor analysis mass spectrometer was developed and utilized to provide real-time validation of training aid odors and detect contamination. Although it was designed to mimic the working environment of a detection canine, its identification of contaminants was limited to the compounds included in their database (Ong et al., Use of Mass Spectrometric Vapor Analysis to Improve Canine Explosive Detection Efficiency. *Anal. Chem.*, 2017, 89 (12), 6482-6490). Other field-portable or handheld vapor detection instruments could be used in the manner, though none or few are capable of the detection limits necessary to detect low levels of cross-contamination relevant to canine olfaction. Other field sampling methods, such as solid phase microextraction (Hook et al., Solid-Phase Microextraction (SPME) for Rapid Field Sampling and Analysis by Gas Chromatography-Mass Spectrometry (GC-MS). *TrAC—Trends Anal. Chem.*, 2002, 21 (8), 534-543; Malley et al., Analysis of Diesel Fuel Contamination in Soils by Near-Infrared Reflectance Spectrometry and Solid Phase Microextraction-Gas Chromatography. *Soil Sediment Contam.*, 1999, 8 (4), 481-489) or thermal desorption tubes (Chan et al., Determination of Organic Contaminants in Residential Indoor Air Using an Adsorption-Thermal Desorption Technique. *J. Air Waste Manag. Assoc.*, 1990, 40 (1), 62-67; Corell et al., Direct and Fast Determination of Polychlorinated Biphenyls in Contaminated Soils and Sediments by Thermal Desorption-Gas Chromatography-Tandem Mass Spectrometry. *J. Chromatogr. A*, 2020, 1610, 460573), may be used to collect or extract volatile compounds from volatiles in the environment, such as from canine training aid kits, and then returned to the laboratory for analysis by gas chromatography with mass spectrometry, or the like.

Lancaster et al. (U.S. Pat. No. 5,445,795A, 1993) describes a vapochromic material that changes color when exposed to VOCs to be incorporated into sensors for monitoring contamination of ground water and soil. Lucero and Hendrickson (U.S. Pat. No. 5,010,776A, 1989) described a method for detecting environmental contamination using a test probe capable of collecting fluid which is this tested for the presence of VOCs.

Emanuel et al. (U.S. Pat. No. 10,408,809B1, 2015) describes a device for the collection and identification of VOCs using a colorimetric sensor array. This patent includes a mechanism for vapor sampling, a sampling cartridge containing a colorimetric sensor array, a camera to collect the image from the array, and a processing unit to identify the VOC of interest based on the response of the array. This incorporates a complex sampling, imaging, and analysis apparatus.

BRIEF SUMMARY

Disclosed herein is an apparatus comprising: a container, a first openable vessel within the container, an analyte within the first vessel, and a vapochromic sensor within the container. The vapochromic sensor changes color on contact with a vapor of the analyte.

BRIEF DESCRIPTION OF THE DRAWING

A more complete appreciation will be readily obtained by reference to the following Description of the Example Embodiments and the accompanying drawing.

FIG. 1 schematically illustrates a canine scent training aid kit.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Cross-contamination of volatile organic compounds (VOCs) between canine scent training aids could result in the incorrect training of canine detection units. This, in turn, could lead to the non-detection of targets during operations and, in some cases, could have adverse legal implications such as evidence suppression or inadmissible searches in cases involving canine detectors. To prevent such outcomes, the concept of an indicator for the cross-contamination of VOCs between closed containers stored in proximity is disclosed. For this purpose, a colorimetric sensor is inserted within the nearby closed containers and will produce a notable change in color when it comes into contact with a specific vapor analyte that will mimic a contaminant in those containers.

The system includes (1) a representative VOC to mimic potential contaminants chosen to have similar properties (i.e. vapor pressure) to the VOCs potentially contained in the training aid kit and reacts with the chosen cross-contamination indicator, and (2) a colorimetric indicator consisting of a single coupon, capable of passive detection of volatiles present in the kit at relevant vapor concentrations to canine detection. Also, the color change is visible by the naked eye, and the unit may be small and inexpensive. It is not necessary for the indicator to specifically identify the VOC detected nor the VOC class. As such, use of a colorimetric sensor array is not necessary.

The colorimetric sensor is incorporated into a canine scent training aid kit to detect any possible cross-contamination of the training aids. The colorimetric sensor may be designed to respond to the most volatile components in a particular training aid kit or to an alternative vaporous analyte, of equal or greater volatility, that is added to the kit. The volatile analyte elicits a visible color change in the sensor. The colorimetric sensor and the analyte may be contained in separate jars, bags, or other manners of containment used for the other training aids in the kit.

Under certain conditions of high humidity, high temperature, rough handling, or long-term storage; the sealed containment of the training aids will fail and the vapors of the most volatile chemicals will escape. When this occurs, the analyte of interest (as one of the most volatile components in the kit) is also released into the open area of the kit and detected by the sensor. The response is a simple, yet visible, color change that is easily detectable to the canine trainer's eyes and indicates that contamination has occurred. This gives the trainers an indication that the training aids should be wiped down to be cleaned or that they should replace that kit with a newer, clean version.

The working design of the application of this sensor is depicted in FIG. 1. The kit 10 includes a container 20 containing several openable vessels 30, 31, such as glass jars. The vessels are intended to remain closed when the kit is not in use. One vessel 31 contains the analyte 40. Several other vessels 30 contain various compounds 50 such as canine training aids. The vapochromic sensor 60, 70 may be anywhere in the container 20, such as the vaporchromic sensor 60 in another vessel 30 or otherwise in the container 20 without further containment 70.

Any sensor and analyte combination could be used, as long as the analyte in the vapor phase causes a visible color change in the sensor. The sensor may use an indicator dye within a sol-gel matrix deposited on a filter paper substrate. This substrate was chosen due to its wide availability, biodegradability, low-cost, and ease of use and disposal. The indicator may be a pH indicator such as bromocresol green or phenol red. An analyte having a pH to cause a color change in the dye would be used.

Sol-gel synthesis involves the formation of a three-dimensional cross-linked structure starting from a colloid solution, which is gelled through a cascade of catalytic reactions at room temperature. Sensitivity may be increased as the vapor in the enclosed container is absorbed into the sponge-like structure formed from the sol-gel synthesis and interacts with the colorimetric agent present there, thus inducing a visible color change.

One example analyte is ammonium hydroxide (vp=2160 mmHg at 25° C.). Optionally, at least one the compounds in the other vessels has a volatility that is less than or equal to the volatility of the analyte. For example, nitromethane (vp=35.5 mmHg at 25° C.) is the most volatile component in a high volatility explosives training aid kit. Moreover, the analyte may be the most volatile substance in the kit. The analyte may be one of the other training aides, or it may be a different compound.

Upon observing a color change in the sensor, the other compounds or the entire kit may be discarded. This method of indicating cross-contamination of VOCs can be implemented in other closed containers apart from canine training aid kits.

Generally, pH indicator dyes are compounds that change color due to the acidity or basicity of their surroundings (Suslick, An Optoelectronic Nose: "Seeing" Smells by Means of Colorimetric Sensor Arrays. *MRS Bull.*, 2004, 29 (10), 720-725; Suslick et al., Colorimetric Sensor Arrays for Molecular Recognition. *Tetrahedron*, 2004, 60 (49), 11133-11138). That is, their color can shift accordingly in response to the nature of the solvent they are exposed to. Similarly, vapochromism is a change in color when a substance is exposed to different vapors (Wenger, Vapochromism in Organometallic and Coordination Complexes: Chemical Sensors for Volatile Organic Compounds. *Chem. Rev.*, 2013, 113 (5), 3686-3733). The ensuing color changes following solvent or vapor exposure can be conveniently observed by the naked eye.

Bromocresol green changes color within a range between pH of 3.8 to 5.4 while phenol red's color shifts between pH of 6.8 to 8.4 (Shokrollahi et al., "Determination of acidity constants of bromophenol blue and phenol red indicators by solution scanometric method and comparison with spectrophotometric results" *J. Molec. Liquids*, 2016, 219, 1165-1171; Shokrollahi et al., "Determination of the acidity constants of neutral red and bromocresol green by solution scanometric method and comparison with spectrophotometric results" Beni-Suef University Journal of Basic and Applied Sciences, 2016, 5 (1), 13-20). Respectively, they alternate between yellow to blue (BCG) or yellow to red (PR) as they go from an acidic environment to a more alkaline environment. Although trapped within the sol-gel matrix, pH indicator dyes have been previously noted to retain their pH color transition capabilities (Zaggout, "Entrapment of phenol red pH indicator into a sol-gel matrix", *Mat. Lett.*, 2006, 60 (8), 1026-1030). Sensors that were made with either BCG or PR indicator responded to a vapor of ammonium hydroxide within an average of 8.5 seconds. The sensor's response time was observed to decrease as the analyte concentration decreased.

There are no previous methods implemented for the indication of the cross-contamination of volatile organic compounds within closed container stored in proximity. The use of this colorimetric sensor for this purpose provides a straightforward, preventative measure for the support and improvement of canine scent training. The sensor can be used in the field and does not require any further laboratory analysis. Additionally, this method of indicating cross-contamination can be implemented across a variety of canine training aid kits.

Instead of analyzing each training aid prior to its use with the vapor analysis mass spectrometer or other vapor detection instrumentation, this method employing a colorimetric sensor allows for the immediate and visible warning of possible cross-contamination of the training aids. Moreover, it is more cost-effective to develop a simple colorimetric sensor than it is to build or purchase a mass spectrometer.

The ultimate purpose of the sensors will be to alert trainers to the possibility of contaminated training aids, which would allow for more efficient training of the canines. A simple colorimetric response to the presence of VOC contamination can be readily incorporated into existing training kits, and will function as a straightforward reminder of when training aids need to be changed or a new containment system should be considered. Moreover, this sensor has the potential to be implemented in other enclosed spaces with the need to determine cross-contamination such as food storage areas, industrial storage units, and law enforcement evidence lockers.

The vapochromic sensor changes color in response to a vapor of the analyte that is undetectable to humans' senses.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. An apparatus comprising:
a container;
a first openable and closable vessel within the container;
an analyte within the first vessel; and
a vapochromic sensor within the container;
    wherein the vapochromic sensor is not within the first vessel; and
    wherein the vapochromic sensor changes color on contact with a vapor of the analyte.

2. The apparatus of claim 1, wherein the analyte is ammonium hydroxide.

3. The apparatus of claim 1, wherein the vapochromic sensor comprises bromocresol green or phenol red.

4. The apparatus of claim 1;
wherein the vapochromic sensor comprises a pH indicator dye; and
wherein the analyte has a pH that changes the color of the dye.

5. The apparatus of claim 1, further comprising:
a second openable and closable vessel within the container;
    wherein the vapochromic sensor is within the second vessel.

6. The apparatus of claim 1, further comprising:
one or more additional openable and closable vessels, each containing a compound.

7. The apparatus of claim 6, wherein at least one the compounds has a volatility that is less than or equal to the volatility of the analyte.

8. The apparatus of claim 6, wherein at least one of the compounds is a canine scent training aid.

9. A method comprising:
observing a color change in the vapochromic sensor of the apparatus of claim 6; and
disposing of the additional vessels.

* * * * *